US009607343B2

(12) United States Patent
Chen et al.

(10) Patent No.: US 9,607,343 B2
(45) Date of Patent: Mar. 28, 2017

(54) GENERATING A DEMAND RESPONSE FOR AN ENERGY-CONSUMING FACILITY

(71) Applicant: Hewlett-Packard Development Company, L. P., Houston, TX (US)

(72) Inventors: Yuan Chen, Sunnyvale, CA (US); Zhenhua Liu, Albany, CA (US); Cullen E Bash, Los Gatos, CA (US); Thomas W Christian, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 597 days.

(21) Appl. No.: 14/014,834

(22) Filed: Aug. 30, 2013

(65) Prior Publication Data

US 2015/0066225 A1 Mar. 5, 2015

(51) Int. Cl.
*G06F 15/173* (2006.01)
*G06Q 50/06* (2012.01)

(52) U.S. Cl.
CPC .................................... *G06Q 50/06* (2013.01)

(58) Field of Classification Search
CPC ........ G05B 15/00; G05B 17/00; G05B 17/02; G05B 19/02; H02J 3/14; H02J 2003/143; H02J 2003/146; Y04S 50/10; Y04S 20/222; Y02B 60/144; G06F 1/3203; G06Q 50/06
USPC ................... 700/276, 291; 713/300; 709/226
See application file for complete search history.

(56) References Cited

U.S. PATENT DOCUMENTS

| | | | | |
|---|---|---|---|---|
| 8,359,598 B2 | | 1/2013 | Diwakar et al. | |
| 8,548,638 B2 | * | 10/2013 | Roscoe | H02J 3/008 700/295 |
| 8,583,350 B1 | * | 11/2013 | Sagar | G05B 19/042 123/1 A |
| 2009/0240381 A1 | * | 9/2009 | Lane | H02J 3/14 700/296 |
| 2012/0004783 A1 | * | 1/2012 | Lo | H02J 3/14 700/291 |
| 2012/0150359 A1 | * | 6/2012 | Westergaard | H02J 3/14 700/291 |
| 2013/0024710 A1 | | 1/2013 | Jackson | |
| 2013/0035795 A1 | | 2/2013 | Pfeiffer et al. | |
| 2013/0111494 A1 | | 5/2013 | Hyser et al. | |
| 2013/0268136 A1 | * | 10/2013 | Cox | H02J 3/14 700/295 |

(Continued)

FOREIGN PATENT DOCUMENTS

CN 102034143 4/2011

OTHER PUBLICATIONS

Wang, D. et al., Energy Storage in Datacenters: What, Where, and How Much, (Research Paper), Jun. 11-15, 2012, 11 Pgs.

*Primary Examiner* — Frantz Jean
(74) *Attorney, Agent, or Firm* — Hewlett Packard Enterprise Patent Department

(57) ABSTRACT

A demand response for an energy-consuming facility is disclosed. A demand response is generated by estimating a likelihood of a coincident peak time period, modeling workloads to be scheduled in the energy-consuming facility, determining a workload schedule based on the likelihood of the coincident peak time period and a plurality of utility charging rates, and scheduling the workloads for execution in the energy-consuming facility according to the determined workload schedule.

20 Claims, 4 Drawing Sheets

(56) References Cited

U.S. PATENT DOCUMENTS

| | | | | |
|---|---|---|---|---|
| 2013/0274936 | A1 * | 10/2013 | Donahue ................ | G06Q 50/06 700/291 |
| 2014/0257907 | A1 * | 9/2014 | Chen ................ | G06Q 10/06312 705/7.22 |

* cited by examiner

GENERATING A DEMAND RESPONSE FOR AN ENERGY-CONSUMING FACILITY

BACKGROUND

The world's energy demand has increased rapidly in recent decades with the spread of industrialization to developing countries and gains in population. It is estimated that by 2025 the total energy demand will be at least four times the current levels. Emerging solutions to address this growth have included the development of alternative energy sources and efforts to incentive consumers to reduce or adjust their energy demand. As an example, utility companies have started to adopt demand response programs to induce consumers' to manage their energy demand in response to changes in energy supply conditions. The National Institute of Standards and Technology ("NIST") and the Department of Energy ("DoE") have both identified demand response as one of the priority areas for the future smart grid. In particular, demand response has the potential to reduce up to 20% of the total peak electricity demand across the country and significantly ease the adoption of renewable energy into the grid.

One of the most common demand response programs available is Coincident Peak Pricing ("CPP"), which is required for medium and large industrial consumers, including data centers, in many regions. These programs work by charging a very high price for usage during the coincident peak hour, often over 200 times higher than the base rate, where the coincident peak hour is the hour when the most electricity is requested by the utility from its wholesale electric supplier. It is common for the coincident peak charges to account for 23% or more of a customer's electric bill. From the perspective of a consumer, it is critical to control and reduce usage during the peak hour.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A demand response scheme for an energy-consuming facility is disclosed. The demand response scheme schedules workloads in the energy-consuming facility according to the likelihood of coincident peak occurrence to optimize the expected energy costs of the facility. The energy-consuming facility may include, for example, a data center, an industrial facility, a commercial facility, a governmental facility, a residential facility, or any other facility that depends on energy (e.g., electricity, water, and so on) to function and operate its workloads. As generally described herein, a workload refers to all energy-dependent activities, processing and operations performed in the facility. For example, data center workloads may include a range of IT workloads, such as non-flexible interactive applications that run 24×7 (e.g., Internet applications, online gaming, etc.) and delay-tolerant, flexible batch-style applications (e.g., scientific applications, financial analysis and image processing). Residential workloads may include a range of home appliance workloads such as washer and dryer workloads, dishwasher workloads, air conditioning workloads, and so on.

In various examples, a demand response scheme for an energy-consuming facility is generated with a demand response system that includes a coincident peak estimation module, a workload prediction module, a workload planner module and a workload scheduling module. The coincident peak estimation module estimates a likelihood that a given time period (e.g., an hour of a 24-hour period, a day in a week period, etc.) is a coincident peak. The estimation is performed based on historical coincident peak data collected from one or more utility companies supplying energy to the energy-consuming facility. The workload prediction module models workloads to be scheduled in the energy-consuming facility. The workload planner module determines a workload schedule for the workloads based on the estimated likelihood of the coincident peak time period and on a plurality of utility charging rates. The workload scheduling module schedules the workloads for execution in the energy-consuming facility according to the determined schedule.

It is appreciated that, in the following description, numerous specific details are set forth to provide a thorough understanding of the example. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
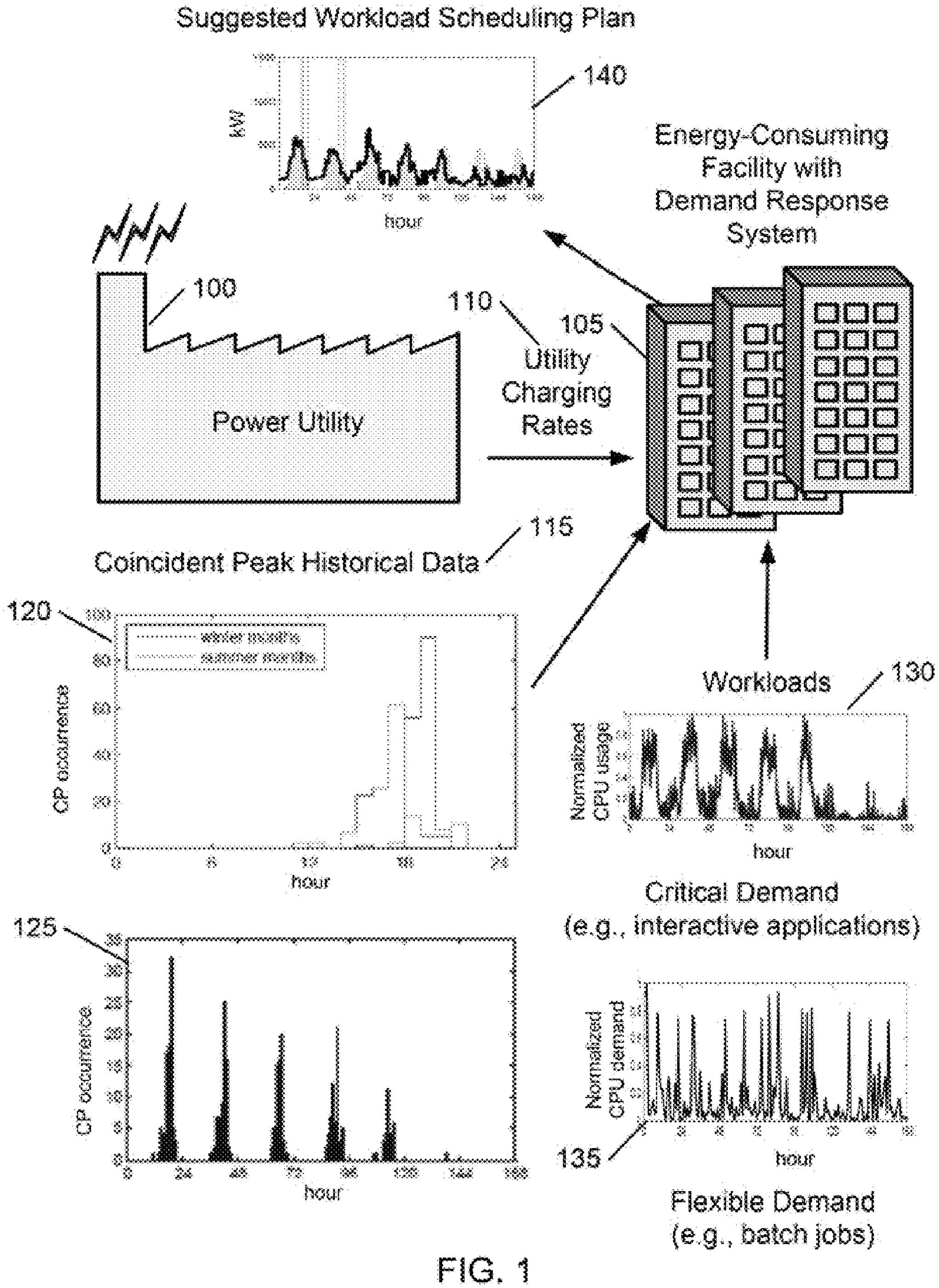
FIG. 1 illustrates a schematic diagram of an environment where a platform for representing numerical data in a mobile device is used in accordance with various examples.

Referring now to FIG. 1, a schematic diagram of and environment where the demand response system is used in accordance with various examples is described. Power utility 100 is a power company that generates, transmits and distributes energy (e.g., electricity) for sales in a local market. The local market typically includes a wide range of energy-consuming facilities, such as residential facilities, commercial facilities, industrial facilities (e.g., data centers), governmental facilities, and so on, that receive energy from the power utility 100. Energy-consuming facility 105 is an example facility having a demand response system to optimize its energy costs. The demand response system schedules workloads in the facility based on a plurality of utility charges 110 and coincident peak historical data 115 provided by the power utility 100.

In various examples, the plurality of utility charges 110 may include: (1) a fixed connection/meter charge; (2) a usage charge; (3) a peak demand charge for usage during the energy-consuming facility's peak hour; and (4) a coincident peak demand charge for usage during the coincident peak ("CP") hour, which is the hour during which the power utility's usage is the highest. The connection and meter charges are fixed charges that cover the maintenance and construction of electric lines as well as services like meter reading and billing. For medium and large industrial energy-consuming facilities such as data centers, these charges make up a very small fraction of the total energy costs. The usage charge works similarly to the way it does for residential consumers. The power utility 100 specifies the electricity price Sp(t)/kWh for each hour. This price is typically fixed throughout each season, but can also be time-varying. Usually p(t) is on the order of several cents per kWh.

The peak demand charge is used to incentivize customers to consume power in a uniform manner, which reduces costs for the power utility 100 due to smaller capacity provisioning. The peak demand charge is typically computed by determining the hour of the month during which the customer's electricity use is highest. This usage is then charged at a rate of $Sp_p$/kWh, which is much higher than p(t) and on the order of several dollars per kWh.

The coincident peak charge is similar to the peak charge, but focuses on the peak hour for the power utility 100 as a whole from its wholesale electricity provider (i.e., the coincident peak) rather than the peak hour for an individual consumer. In particular, at the end of each month, the peak usage hour for the power utility 100, $t_{cp}$, is determined and then all consumers are charged $Sp_{cp}$/kWh for their usage during this hour. This rate is again at the scale of several dollars per kWh, and can be significantly larger than the peak demand charging rat $p_p$. Table 1 shows example charging rates charged by the Fort Collins Utilities company in Fort Collins, Col.

TABLE 1

Charging rates of Fort Collins Utilities during 2011 and 2012.

| Charging Rates | 2011 | 2012 |
|---|---|---|
| Fixed $/month | 54.11 | 61.96 |
| Additional meter $/month | 47.81 | 54.74 |
| CP summer $/kWh | 12.61 | 10.20 |
| CP winter $/kWh | 12.61 | 7.64 |
| Peak $/kWh | 4.75 | 5.44 |
| Energy summer $/kWh | 0.0245 | 0.0367 |
| Energy summer $/kWh | 0.0245 | 0.0349 |

First, it is interesting to note that all the charging rates are fixed and announced at the beginning of the year, which eliminates any uncertainty about prices with respect to planning on the part of the energy-consuming facilities. Further, the prices are constant within each season; however the Fort Collins Utilities company began to differentiate between summer months and winter months in 2012. Second, because the coincident peak price and the peak price are both so much higher than the usage price, the costs associated with the coincident peak and the peak are important components of the energy costs of an energy-consuming facility. In particular, $$\frac{p_p}{p}$$

is 194 and 148, and $$\frac{p_{cp}}{p}$$

is 514 and 219, in 2011 and winter 2012 respectively. Hence, it is very critical to reduce both the peak demand and the coincident peak demand in order to lower the total cost for the energy consuming facility 105. A final observation is that the coincident peak price is higher than the peak demand price: 2.6 times and 1.4 times higher in 2011 and winter 2012, respectively. This means that the reduction of energy demand during the coincident peak hour is more important, further highlighting the importance of avoiding coincident peaks.

In order to estimate when a coincident peak occurs for a given energy-consuming facility (e.g., facility 105), it is insightful to analyze coincident peak historical data provided by the power utility (e.g., power utility 100) supplying energy to the facility. For example, coincident peak historical data 115 covers a period from January 1986 to June 2012 for the Fort Collins Utilities for the city of Fort Collins, Col. The historical data 115 includes the date and hour of the coincident peak each month. Understanding properties of the coincident peaks is particularly important when considering demand response for the energy-consuming facility 105.

Graph 120 depicts the number of coincident peak occurrences during each hour of the day. From the figure, we can see that the coincident peak has a strong diurnal pattern: the coincident peak nearly always happens between 2 pm and 10 pm. Additionally, graph 120 highlights that the coincident peak has different seasonal patterns in winter and summer; the coincident peak occurs later in the day during winter months than during summer months. Further, the time range that most coincident peaks occur is narrower during winter months. The number of coincident peak occurrences on a weekly basis is shown in graph 125. The data shows that the coincident peak has a strong weekly pattern: the coincident peak almost never happens on the weekend, and the likelihood of occurrence decreases throughout the weekdays.

The coincident peak historical data 115 highlights a number of important observations discussed above that enable a demand response system for the energy-consuming facility 105 to avoid the coincident peak and reduce its overall energy costs by scheduling its workloads accordingly. The uncertainty of the occurrence of the coincident peak hour presents significant challenges for workload scheduling in the energy-consuming facility 105. For example, traditional workload scheduling can be done using workload and cost estimates a day in advance, but the coincident peak is not known until the end of the month. Further, workloads may be of different types and need to be modeled accordingly to generate a workload schedule that satisfies their characteristics. Graph 130 shows the pattern of critical demand workloads (e.g., Internet applications, online gaming, etc.), while graph 135 shows the pattern of delay-tolerant, flexible workloads (e.g., batch applications, scientific applications, financial analysis and image processing). Deriving a workload model enables a demand response system to determine a workload scheduling plan 140 that fits the performance needs of each workload.

Given the uncertainty about the coincident peak hour, the demand response system designed for energy-consuming facility 105 and described in more detail below solves a constrained optimization problem to determine how best to schedule workloads based on the likelihood of each time period to be the coincident peak and the plurality of utility charging rates established by the power utility 100.

Figure 2:
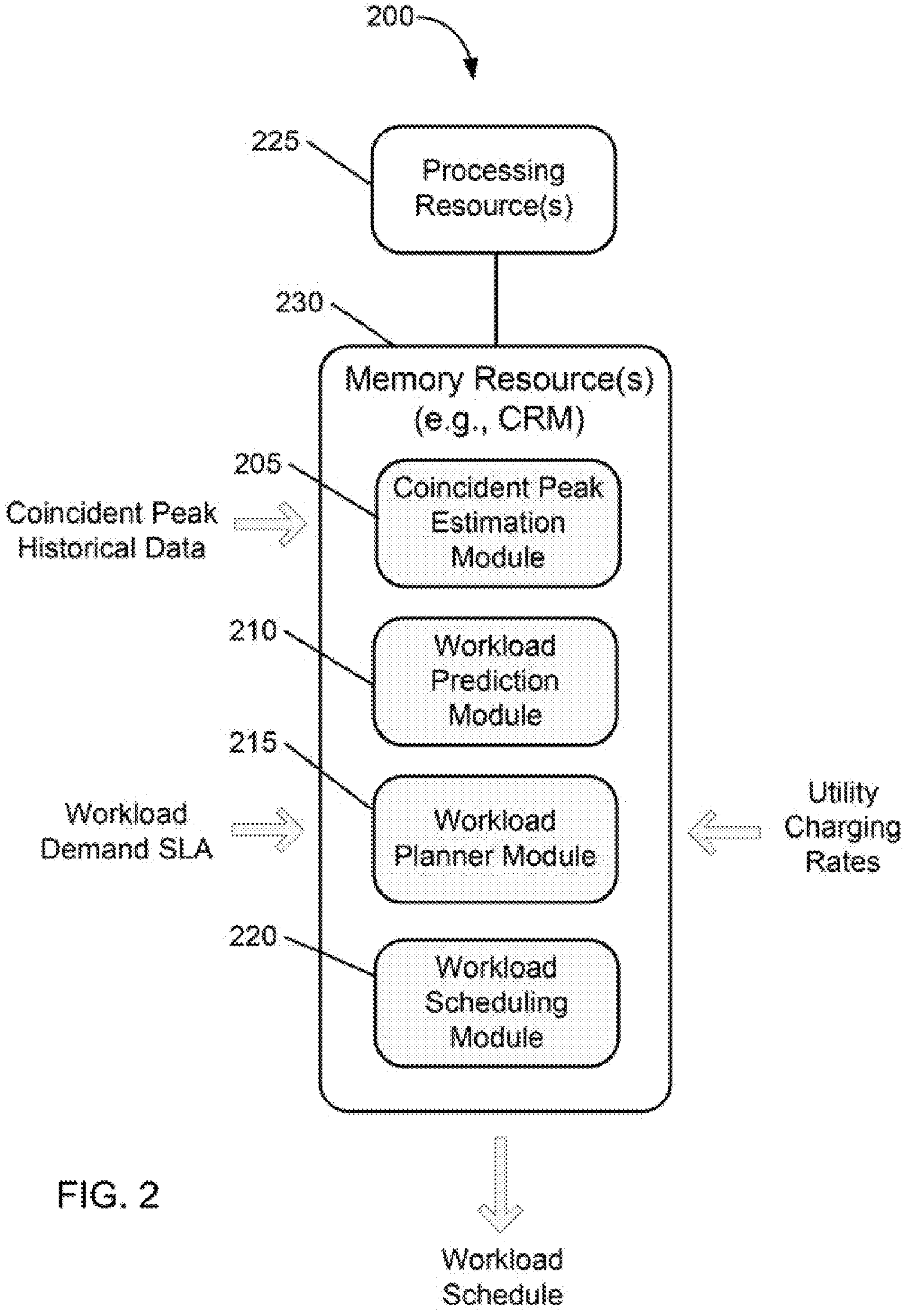
FIG. 2 illustrates examples of physical and logical components for implementing a demand response system.

Attention is now directed to FIG. 2, which shows examples of physical and logical components for implementing the demand response system. The demand response system 200 has various modules, including, but not limited to, a Coincident Peak Estimation Module 205, a Workload Prediction Module 210, a Workload Planner Module 215, and a Workload Scheduling Module 220. In an example implementation, modules 205-220 may be implemented as instructions executable by one or more processing resource(s) 225 and stored on one or more memory resource(s) 230.

A memory resource 230, as generally described herein, can include any number of memory components capable of storing instructions that can be executed by processing resource(s) 225, such as a non-transitory computer readable medium. It is appreciated that memory resource(s) 230 may be integrated in a single device or distributed across multiple devices. Further, memory resource(s) 230 may be fully or partially integrated in the same device (e.g., a server device) as processing resource(s) 225 or it may be separate from but accessible to processing resource(s) 225. Accordingly, demand resource system 200 may be implemented on a server device or on a collection of server devices, such as in one or more web servers.

Coincident Peak Estimation Module 205 estimates a likelihood that a given time period (e.g., an hour of a 24-hour period, a day in a week period, etc.) is a coincident peak. The estimation is performed based on an analysis of historical coincident peak data collected from one or more utility companies supplying energy to the energy-consuming facility. The Workload Prediction Module 210 models workloads to be scheduled in the energy-consuming facility. In particular, critical, interactive workloads and flexible workloads are modeled according to their characteristics. The Workload Planner Module 215 determines a workload schedule for workloads in the energy-consuming facility based on the estimated likelihood of the coincident peak time period and on a plurality of utility charging rates. Lastly, the Workload Scheduling Module 220 schedules the workloads for execution in the energy-consuming facility according to the determined schedule. The operations of modules 205-220 are described below.

Figure 3:
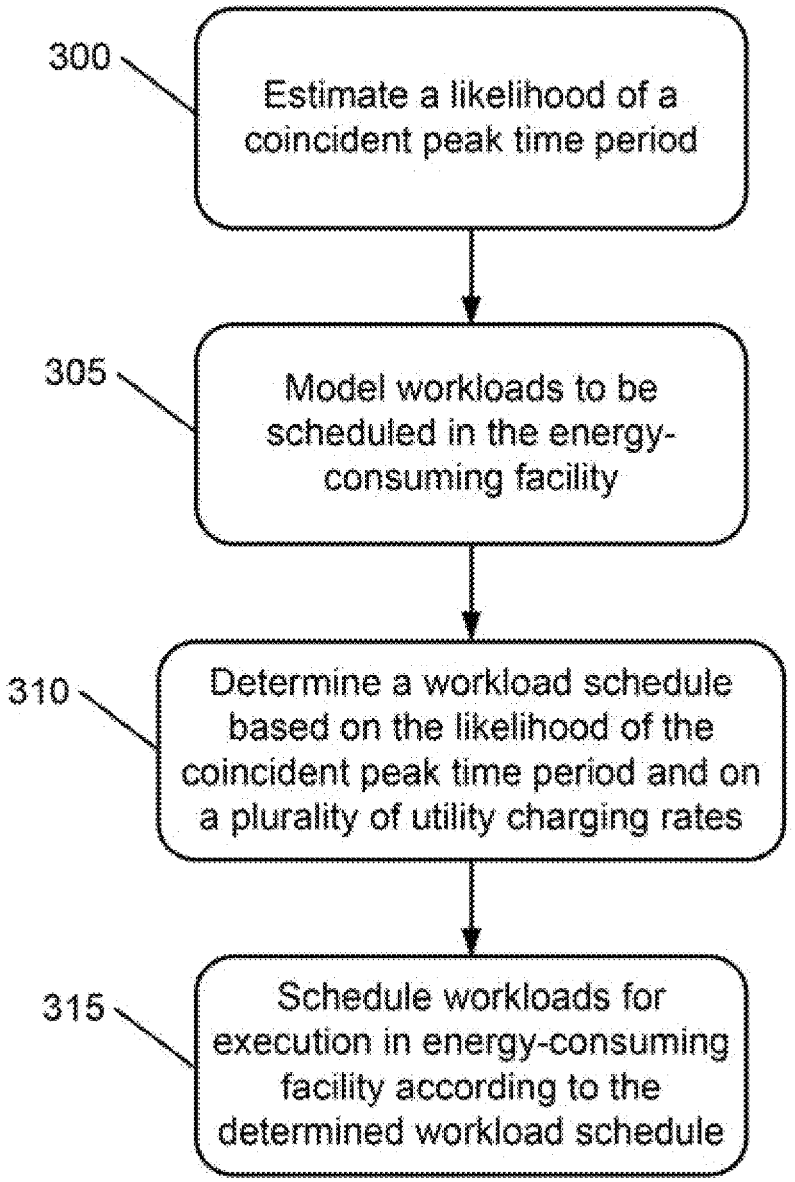
FIG. 3 is a flowchart of example operations performed by the demand response system of FIG. 2 for generating a demand response for an energy-consuming facility.

Referring now to FIG. 3, a flowchart of example operations of the demand response system of FIG. 2 for generating a demand response for an energy-consuming facility is described. First, a likelihood of a coincident peak time period is estimated by the Coincident Peak Estimation Module 205 (300). The Coincident Peak Estimation Module 205 collects coincident peak historical data (e.g., historical data 115) from one or more power utilities supplying energy to the energy-consuming facility and estimates the likelihood of a coincident peak time period (e.g., hour, day, etc.) as the normalized coincident peak occurrence of that time period in the historical data. The likelihood estimation can also take account other factors in addition to the historical data, such as, for example, weather and other external factors that may affect the coincident peak.

Next, the Workload Prediction Module 210 models workloads to be schedules in the energy-consuming facility (305). First, let d(t) denote the total power demand required to operate workloads in the energy-consuming facility. As described above, the workloads may include a range of non-flexible and flexible workloads. In the case of a data center for example, the workloads may include both non-flexible interactive applications that run 24×7 (e.g., Internet services, online gaming, etc.) and delay tolerant, flexible batch-style applications (e.g., scientific applications, financial analysis, and image processing). Flexible workloads can be scheduled to run anytime as long as the jobs finish before their deadlines. These deadlines are much more flexible (several hours to multiple days) than that of interactive workloads.

Let I be the total number of interactive workloads for the energy-consuming facility. For interactive workload i, the arrival rate at time t is $\lambda_i(t)$. The energy-consuming facility (e.g., data center) may be bound by service level agreements ("SLAs") that specify a service rate and target performance metrics (e.g., average delay, or $95^{th}$ percentile delay) for the workloads. The energy demand required by each interactive workload i at time t, denoted by $\alpha_i(t)$, can be determined based on the service rate and target performance metrics specified by the SLAs. The energy demand $\alpha_i(t)$ can also be derived from analytic performance models or system measurements as function of $\lambda_i(t)$, because performance metrics generally improve as the capacity allocated to the workload increases.

In various examples, the energy demand $\alpha_i(t)$ can be determined by analyzing the characteristics and stochastic properties of the interactive workloads. Though there is variability in workload demands, workloads often exhibit clear short-term and long-term patterns. To predict the resource demand (e.g., CPU resource) for interactive applications, a periodicity analysis of historical workload traces can be performed to reveal the length of a pattern or a sequence of patterns that appear periodically. The Fast Fourier Transform ("FFT") can be used to find the periodogram of the time-series data so that the periods of the most prominent patterns or sequences of patterns in the workloads can be derived. Most interactive workloads tend to exhibit prominent daily patterns. In particular, an auto-regressive model can be used to provide both the long term and short term patterns and predict $\alpha_j(t)$.

Flexible batch jobs are more difficult to characterize since they typically correspond to internal workloads and are thus harder to attain accurate traces for. Let J denote the total classes of flexible jobs in an energy-consuming facility. Class j jobs in a data center, for example, have a total demand of $B_j$, maximum parallelization of $MP_j$, starting time $S_j$ and deadline of completion $E_j$. Let $b_j(t)$ denote the amount of capacity allocated to class j jobs at time t. The total workload power demand at time t is therefore given by:

$$d_W(t) = \sum_{i=1}^{t} a_i(t) + \sum_{j=1}^{J} b_j(t) \quad \text{(Eq. 1)}$$

Given a total workload capacity D in units of kWh, it follows that:

$$0 \le d_W(t) \le D_{x\forall t} \quad \text{(Eq. 2)}$$

Since the goal is to reduce energy costs, $d_W(t)$, $\alpha_i(t)$, and $b_i(t)$ can be interpreted to be the energy necessary to serve the demand, and thus in units of kWh and subject to:

$$0 \le b_j(t) \le MP_j,\ \forall t \quad \text{(Eq. 3)}$$

$$\sum_{t\in[S_j,E_j]} b_j(t) = B_j \quad \text{(Eq. 4)}$$

Equation 4 above in essence specifies a workload constraint that all flexible workloads be completed within the total power demand for the flexible workloads before corresponding deadlines.

In the case of data centers, in addition to the power demands of the workloads themselves, their cooling facilities can contribute a significant portion of the energy costs. Cooling power demand depends fundamentally on the workload power demand, and so can be derived from the workload power demand through cooling models. Let the cooling power associated with the workload power demand $d_W(t)$, $c(d_W)$, be a convex function of $d_W(t)$. An example cooling model that may be used in the Power Usage Effectiveness ("PUE") model as follows:

$$c(d(t))=(\text{PUE}(t)-1)*d(t) \quad \text{(Eq. 5)}$$

Note that PUE(t) is the PUE at time t, and varies over time depending on environmental conditions, e.g., the outside air temperature.

The total power demand can therefore be denoted by:

$$d(t)=d_W(t)+c(d_W(t)) \quad \text{(Eq. 6)}$$

Using the above equations for the power demand at an energy-consuming facility, the Workload Planner Module 215 then determines a workload schedule based on the likelihood of the coincident peak time period and the plurality of utility charging rates charged by the power utility (ies) supplying energy to the energy-consuming facility (310). The workload schedule is determined to minimize the operational energy costs of the facility. In particular, the following constrained optimization problems can be formulated and solved to determine an optimal workload schedule.

$$\min_b \sum_{i=1}^{T} p(t)d(t) + p_p \max_i d(t) + \sum_{i=3}^{T} p_{cp}\hat{w}(t)d(t) \quad \text{(Eq. 7)}$$

subject to a power demand constraint specified by Equation 2 and the workload constraint specified by Equations 3 and 4, where p(t) is the usage charging rate at time t, $p_p$ is the peak demand charging rate, $p_{cp}$ is the coincident peak charging rate, and $\hat{w}(t)$ is the likelihood that time t is the coincident peak hour (estimated by the Coincident Peak Estimation Module 205). The constrained optimization problem constitutes a power cost function that needs to be solved and minimized to determine an optimal workload schedule over time. The cost function has in essence three parts: (1) a usage charging portion; (2) a peak demand charging portion; and (3) an expected coincident peak charging portion.

Solving Equation 7 for b(t) provides an optimal workload schedule for flexible workloads that can be executed in the energy-consuming facility while minimizing energy costs. Given the resulting schedule, the Workload Scheduling Module 220 schedules the workloads for execution in the energy-consuming facility (315). It is noted that Equation 7 above can be modified according to the type of energy-consuming facility and to deal with other constraints. For example, the cooling model introduced in Equation 5 may not be needed for residential facilities and Equation 6 would be simplified to $d(t)=d_W(t)$.

Figure 4:
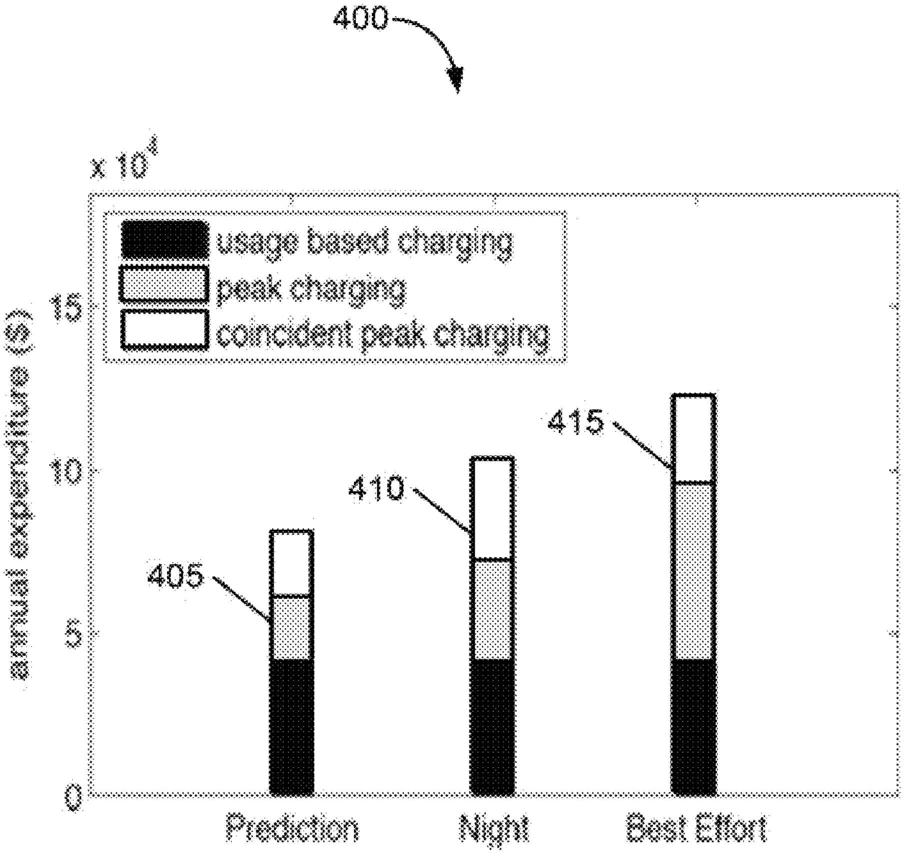
FIG. 4 is a graph illustrating the performance of the demand response system of FIG. 2.

Attention is now directed to FIG. 4, which shows the performance of the demand response system described above. Graph 400 shows that the demand response system 200 (FIG. 2) significantly reduces the energy costs of an energy-consuming facility as compared to traditional approaches. The demand response system 200 implementation is denoted "Prediction" and shown in column bar 405. The baseline system comparisons are denoted "Night" (410) and "Best Effort" (415) and meant to mimic current industry standard planning. Night 410 tries to run workloads during the night if possible and otherwise run the workloads with a constant rate to finish before their deadlines. Best Effort 415 finishes workloads in a first-come, first-serve manner as fast as possible. As shown in graph 400, the demand response system 200 described herein provides 22-35% energy cost savings (405) compared to Night 410 and Best Effort 415. In particular, the demand response system 200 reshapes the flexible workloads to prevent using the time slots that are likely to be the coincident peaks and to reduce the peak demand as much as possible, therefore significantly reducing energy costs.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer implemented method for generating a demand response for an energy-consuming facility performed by processor resources coupled to a non-transitory memory resource storing instructions that when executed by the processing resource cause the processing resource to execute the steps, comprising:

estimating a likelihood of a coincident peak time period during which power usage from all customers of a power utility is highest by analyzing coincident peak historical data provided by the power utility to the energy-consuming facility;

modeling workloads to be scheduled in the energy-consuming facility into non-flexible interactive workloads and flexible workloads with corresponding deadlines;

determining a workload schedule based on the likelihood of the coincident peak time period and a plurality of utility charging rates; and scheduling the workloads for execution in the energy-consuming facility according to the determined workload schedule to minimize expected operational energy costs to the energy-consuming facility wherein the flexible workloads are completed before the corresponding deadlines.

2. The computer implemented method of claim 1, wherein a coincident peak time period comprises a coincident peak hour.

3. The computer implemented method of claim 1, wherein estimating a likelihood of a coincident peak time period comprises collecting historical data on coincident peaks from more than one utility company supplying energy to the energy-consuming facility.

4. The computer implemented method of claim 3, wherein the likelihood of a coincident peak time period comprises a normalized coincident peak occurrence of that time period in the historical data.

5. The computer implemented method of claim 1, wherein the plurality of utility charging rates comprises a usage charging rate, a peak demand charging rate, and a coincident peak charging rate, and wherein energy demand required for each of the non-flexible interactive workloads at a time in the schedule is determined based on service rates and target performance metrics from service level agreements.

6. The computer implemented method of claim 1, wherein modeling workloads to be scheduled in the energy-consuming facility comprises analyzing the characteristics and stochastic properties of the non-flexible interactive workloads and wherein resource demands for the non-flexible interactive workloads is determined by periodicity analysis of historical non-flexible interactive workload traces.

7. The computer implemented method of claim 1, wherein determining a workload schedule for workloads comprises solving a constrained optimization problem subject to a power demand constraint that a sum of a power demand for non-flexible interactive workloads and a power demand for flexible workloads be within a power capacity of the energy-consuming facility.

8. The computer implemented method of claim 7, wherein the power demand constraint comprises a cooling power demand that depends on the power demand for the non-flexible interactive workloads and the power demand for the flexible workloads.

9. The computer implemented method of claim 7, wherein the constrained optimization problem comprises a workload constraint that the flexible workloads be completed before corresponding deadlines based on service rate and target performance metrics specified by service level agreements.

10. The computer implemented method of claim 9, wherein solving the constrained optimization problem comprises minimizing the expected operational energy cost subject to the power demand constraint, the workload constraint, and other external factors that affect the likelihood of the coincident peak time period.

11. A system for generating a demand response for an energy-consuming facility, comprising:

a processor; and a set of non-transitory memory resources storing a set of modules with routines executable by the processor, the set of modules comprising:

a coincident peak estimation module to estimate a likelihood of a coincident peak time period during which power usage from all customers of a power utility is highest by analyzing coincident peak historical data provided by the power utility to the energy-consuming facility;

a workload prediction module to model workloads to be scheduled in the energy-consuming facility into non-flexible interactive workloads and flexible workloads with corresponding deadlines;

a workload planner module to determine a workload schedule based on the likelihood of a coincident peak time period and a plurality of utility charging rates; and a workload scheduling module to schedule the workloads for execution in the energy-consuming facility according to the determined workload schedule to minimize expected operational energy costs to the energy-consuming facility and wherein the flexible workloads are completed before the corresponding deadlines.

12. The system of claim 11, wherein the coincident peak estimation module comprises routines to calculate a normalized coincident peak occurrence of the time period in a historical coincident peak data set from a plurality of utility companies supplying energy to the energy consuming facility.

13. The system of claim 11, wherein the plurality of utility charging rates comprises a usage charging rate, a peak demand charging rate, and a coincident peak charging rate, and wherein resource demands for the non-flexible interactive workloads is determined by periodicity analysis of historical non-flexible interactive workload traces.

14. The system of claim 11, wherein the workload planner module comprises routines for minimizing the expected operational energy cost subject to a power demand constraint, a workload constraint, and wherein energy demand required for each of the non-flexible interactive workloads at a time in the schedule is determined based on service rates and target performance metrics from service level agreements.

15. The system of claim 14, wherein the power demand constraint specifies that a total power demand for the non-flexible interactive workloads, the flexible workloads, and a cooling power demand be within a power capacity of the energy-consuming facility.

16. The system of claim 14, wherein the workload constraint specifies that the flexible workloads be completed before corresponding deadlines within a total power demand for the flexible workloads.

17. The system of claim 11, wherein the energy-consuming facility comprises one of a data center, a commercial facility, an industrial facility, a government facility and a residential facility.

18. A non-transitory computer readable medium comprising instructions executable by a processor to:

analyze historical data from a utility company associated with a data center to determine a plurality of coincident peaks during which power usage from all customers of the utility company is highest;

determine a likelihood of a time period being a coincident peak based on the analysis of the historical data by analyzing coincident peak historical data provided by the utility company to the energy-consuming facility;

determine a power cost function based on a plurality of utility charging rates for a usage charging portion, a peak demand charging portion and an expected coincident peak charging portion by modeling workloads to be scheduled in the energy-consuming facility into non-flexible interactive workloads and flexible workloads with corresponding deadlines, and solve the power cost function to determine a workload schedule over time for flexible data center workloads by:

determining the workload schedule based on the likelihood of the coincident peak time period and the plurality of utility charging rates, and scheduling the workloads for execution in the energy-consuming facility according to the determined workload schedule to minimize expected operational energy costs to the energy-consuming facility wherein the flexible workloads are completed before corresponding deadlines.

19. The non-transitory computer readable medium of claim 18, wherein the usage charging portion comprises a usage charging rate, the peak demand charging portion comprises a peak demand charging rate, and the expected coincident peak charging portion comprises a coincident peak charging rate, and wherein resource demands for the non-flexible interactive workloads is determined by periodicity analysis of historical non-flexible interactive workload traces.

20. The non-transitory computer readable medium of claim 18, wherein the cost function is solved subject to a power demand constraint, a workload scheduling constraint, and wherein energy demand required for each of the non-flexible interactive workloads at a time in the schedule is determined based on service rates and target performance metrics from service level agreements.

* * * * *